United States Patent [19]

Takahashi

[11] Patent Number: 4,868,661
[45] Date of Patent: Sep. 19, 1989

[54] VIDEO PRINTER

[75] Inventor: Keizo Takahashi, Tokyo, Japan

[73] Assignee: Yorica Koki Co., Ltd., Tokyo, Japan

[21] Appl. No.: 100,346

[22] Filed: Sep. 23, 1987

[30] Foreign Application Priority Data

Sep. 3, 1987 [JP]   Japan ............................ 62-134012[U]

[51] Int. Cl.⁴ ............................................ H04N 5/222
[52] U.S. Cl. ...................................... 358/185; 358/225
[58] Field of Search ........................ 352/104; 354/295;
358/185, 225, 214–216, 244, 244.1, 244.2, 332, 345, 348

[56] References Cited

U.S. PATENT DOCUMENTS 3,718,760  2/1973  Patels et al. ..................... 358/225 X
3,951,518  4/1976  Kobayashi et al. ............. 352/104 X
4,458,270  7/1984  Kuno et al. ......................... 358/225
4,698,683  10/1987  Schwartz et al. ................. 358/54 X Primary Examiner—James B. Mullins
Attorney, Agent, or Firm—Donald W. Hanson

[57] ABSTRACT

This invention has an object to provide a video printer capable of recording both a video by a movie projector and a photograph, a picture on a video tape. In this invention, the video printer comprises a lens attached to one end of a box for projecting a video, a light source mounted in the box, a holder formed at the other end of the box and formed with a glass surface at one end thereof for a photograph or a picture, and screen means opened or closed at a member having a glass surface and another member having a mirror surface at one end thereof as an axis to be detachably exchangeably attached so that the glass surface is disposed inside for displaying the video projected from a movie projector.

7 Claims, 4 Drawing Sheets

VIDEO PRINTER

BACKGROUND OF THE INVENTION

This invention relates to a video printer adapted to record a video of a photograph or a movie projection on a video tape and to reproduce the video on a television for a pleasure.

A video printer in which a video is projected in front of a screen by a movie projector, the video is reflected by an internal prism to be projected to a lens of side, and the video is recorded by a video camera on a video tape is heretofore known.

The conventional video printer of this type merely records the video projected by a movie projector on a video tape, but cannot record a photograph or a picture on the video tape. If the photograph or the picture can be recorded on the video tape, the title of the video by a movie projection can be recorded on the video tape, and it is very convenient.

BRIEF SUMMARY OF THE INVENTION

An object of this invention is to provide a video printer which can eliminates the above-mentioned drawbacks, and which can record both a video by a movie projector and a photograph, a picture on a video tape.

The above and other related objects and features of the invention will be apparent from a reading of the following description of the disclosure found in the accompanying drawings and the novelty thereof.

DETAILED DESCRIPTION OF THE PREFERRED EMBODIMENTS

Figure 1:
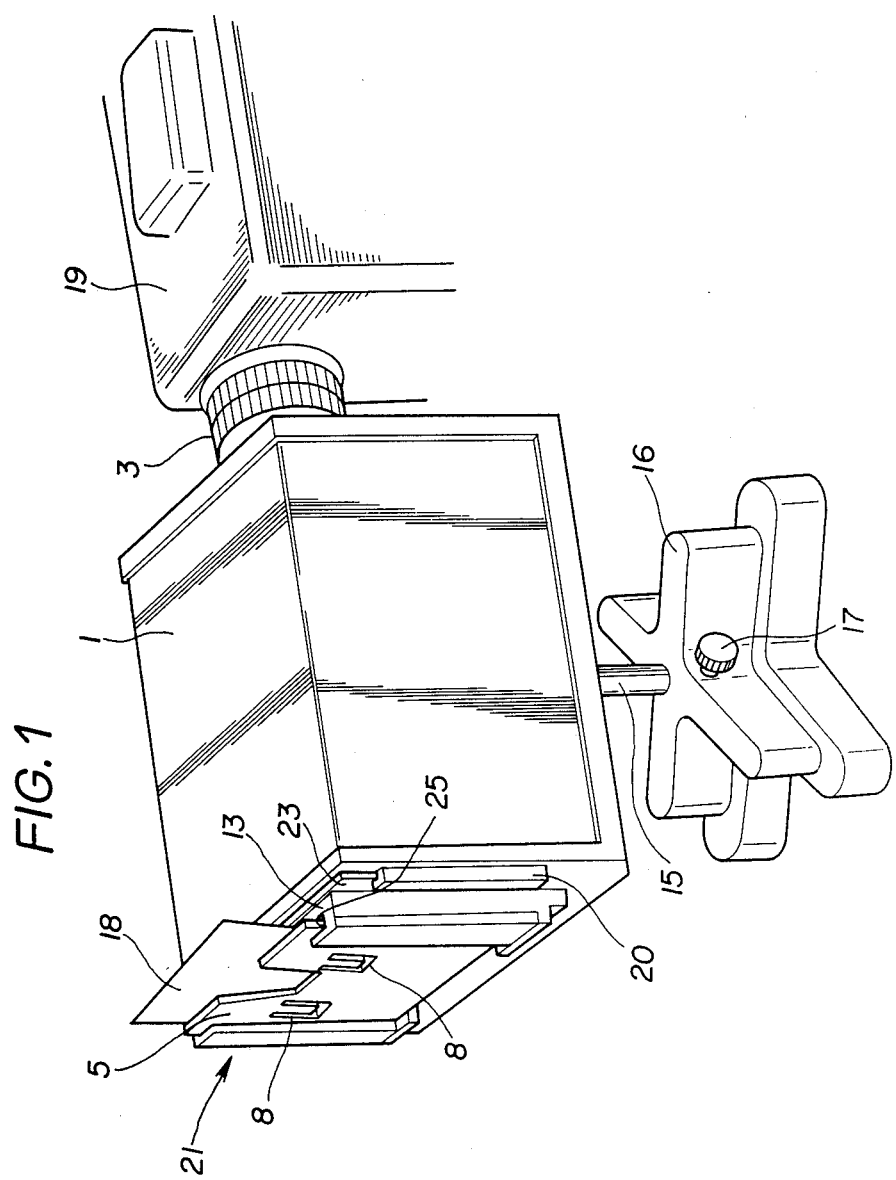
FIG. 1 is a perspective view showing a video printer adapted to record a photograph or a picture on a video tape.

The constitution of a video printer of this invention for performing the above-mentioned object comprises a lens attached to one end of a box for projecting a video, a light source mounted in the box, a holder formed at the other end of the box and formed with a glass surface at one end thereof for a photograph or a picture, and screen means opened or closed at a member having a glass surface and another member having a mirror surface at one end thereof as an axis to be detachably exchangeably attached so that the glass surface is disposed inside for displaying the video projected from a movie projector.

A preferred embodiment of this invention will be described with reference to the accompanying drawings.

FIGS. 1 to 4 are perspective views showing an embodiment of a video printer according to the present invention, wherein a lens 3 is attached to one end face of a box 1, and a fluorescent lamp 4 is mounted in the box.

Frame plates 20 of L-shaped section are so fixed to both sides of the other end face of the box 1 as to form engaging grooves 12 between the frame plates 20 and the other end face of the box 1. A holder 21 for a photograph or a picture and screen means 22 for displaying a video projected from a movie projector are detachably engaged to be slidably inserted by flanges 23, 24 formed at both side ends of the holder 21 and the screen means 22 with the grooves 12.

The holder 21 for a photograph or a picture is formed by so clamping slender plates 13 to both side ends of a frame as to form engaging grooves 25 at both side ends between the frame and the slender slider plates 13 with bottoms at the lower ends of both side ends of the frame together with a transparent glass plate 2 provided in the holder 21, and a plate 5 can be detachably inserted at both side ends from above downward into the engaging grooves 25. The plate 5 is formed at its upper portion with a cutout 6 of inverted trapezoidal shape for readily detachably insert a photograph or a picture, and is also formed at both sides of the center thereof with slender U-shaped cutouts 7 to form a retainer pieces 8 for retaining at both sides a photograph or a picture. The retainer pieces 8 are formed to elastically hold the photograph or picture, and projections 9 are formed on both front and back surfaces of the lower end portions of the respective retainer pieces 8 of the plate 5.

The screen means 22 for displaying the video projected by a movie projector is composed by coupling a frame plate 27 to which a ground glass 26 is attached and a plate 29 on which a mirror 28 is mounted on the inner surface thereof by one or more hinges 34 at one side end thereof to be openably closed so that the mirror face is disposed inside. A projection 33 is formed on the other side end of the frame plate 27 to which the ground glass 26 is attached, and is engaged with a small opening 30 formed on the mirror surface side of the plate 29 to oppose each other. Reference numerals 35 and 35' designate connecting arms having recesses 32 and 32' formed at the outer ends thereof to be engaged with projections 36 formed on the upper and lower surfaces of one side end of the plate 29 on which the mirror 28 is mounted in the state that the frame plate 27 to which the ground glass 26 is attached and the plate 29 are pivotally opened laterally at approx. 45° at the hinges 34 as a pivot.

Figure 2:
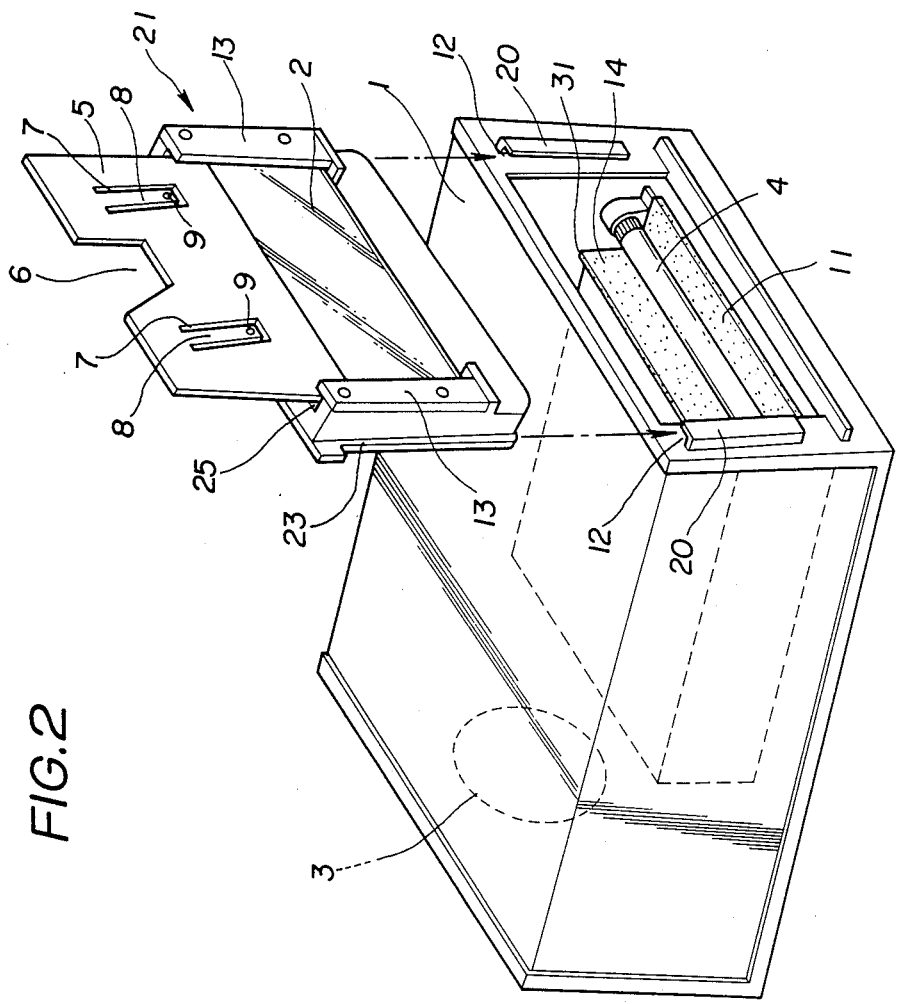
FIG. 2 is a perspective view showing how a holder for a photograph or a picture is engaged with the printer.
Figure 3:
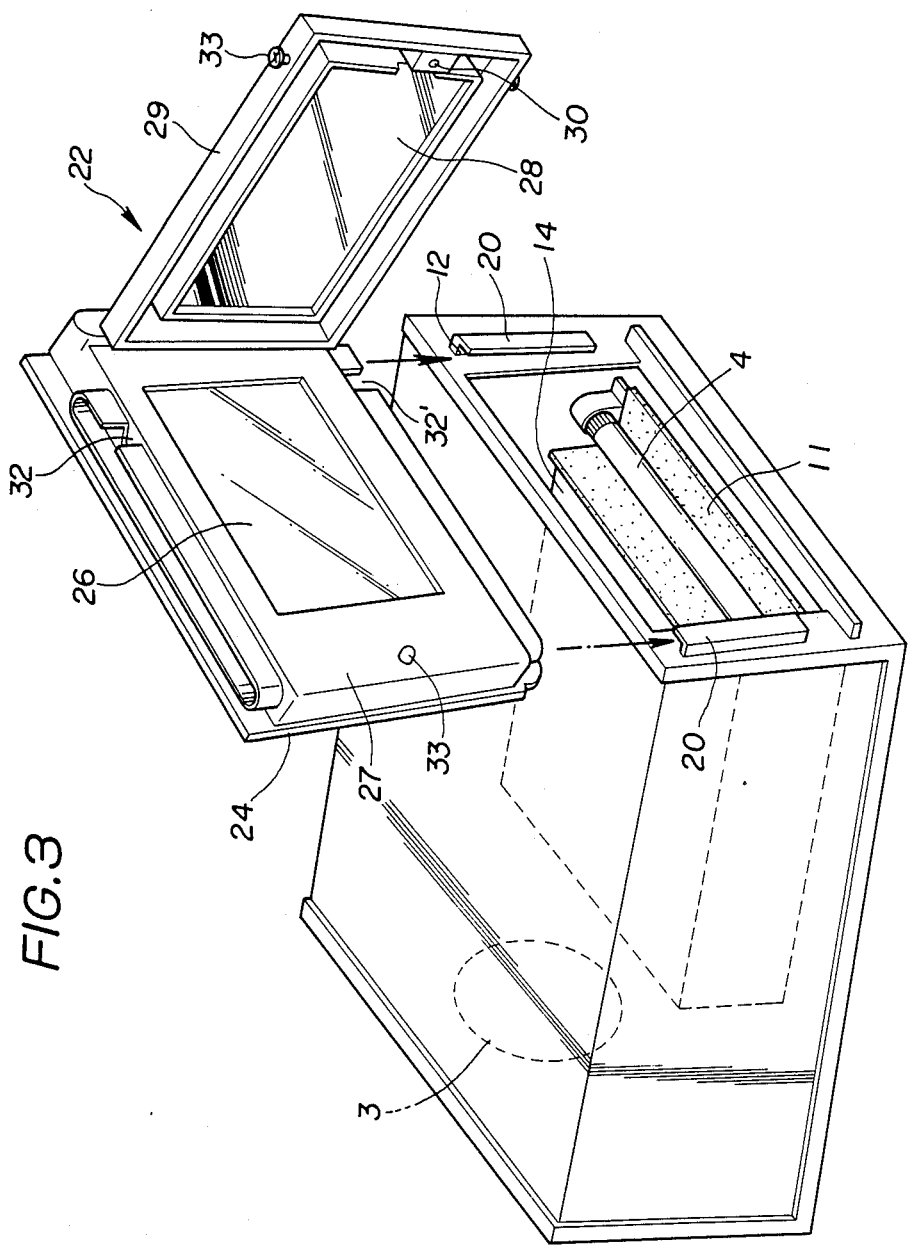
FIG. 3 is a perspective view showing a screen means is engaged with the printer.

The box 1 is composed therein, as shown in FIGS. 2 and 3, of a stepped portion 14, and the fluorescent lamp 4 is mounted in parallel with the other end face of the box 1 above the bottom 11 of the stepped portion 14. A reflecting plate 31 made of silver paper in L-shaped section is fixed to the stepped portion 14 to which the fluorescent lamp 4 is attached. This reflecting plate 31 serves to radiate uniform light from the lamp 4 in large quantity to the photograph or the picture inserted to the holder 21.

The fluorescent lamp 4 is turned on by closing a switch, not shown, provided to be connected to a power source such as a battery mounted on the lower surface of the box 1.

A height adjusting rod 15 is clamped at its upper end to the bottom of the box 1, and engaged at its lower end with legs 16, and the rod 15 can be elevationally movably secured by a screw 17 engaged from the side of the leg 16 to the rod 15.

The operation of the video printer constructed as described above will be described.

As shown in FIG. 1, the holder 21 for a photograph or a picture is slidably inserted at both side ends into the engaging grooves 12 on the other end face of the box 1.

A picture 18 on which a title is, for example, drawn is inserted between the glass plate 2 and the plate 5. Then, the switch is closed to light the fluorescent lamp 4. The photograph enlarged through the lens 3 is recorded by a video camera 19 on a video tape.

Then, the holder 21 for the photograph or the picture is removed from the engaging grooves 12 of the box 1, and the screen means 22 for displaying the video projected from a movie projector is engaged with the engaging grooves 12 of the box 1.

Figure 4:
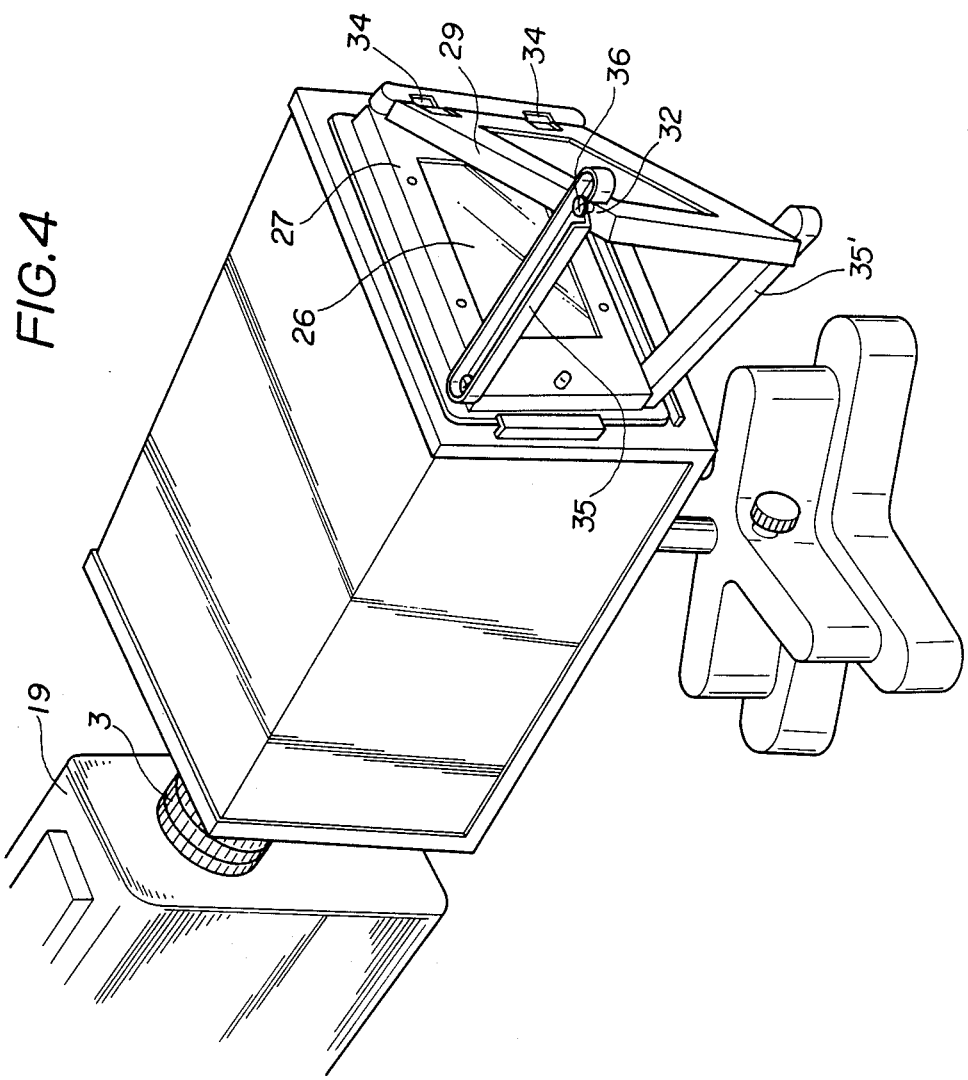
FIG. 4 is a perspective view showing video printer adapted to record a movie projection on a video tape.

As shown in FIG. 4, the plate 27 to which the ground glass 26 is attached and the plate 29 on which the mirror 28 is mounted on the inner surface are pivotally opened at a suitable angle such as approx. 45°, and the end recesses 32 of the connecting arms 35, 35' are engaged with the projections 36 to be fixed. Then, while a video is being projected to the mirror surface 28 by a movie projector (not shown), the video reflected or transferred to the ground glass 26 is recorded through the lens 3 by the video camera 19 on the video tape.

According to the present invention as described above, both a photograph or a picture and a video projected by a movie projector can be recorded on a video tape by very simple video projector. Therefore, the title of the video projected by the movie projector can be also recorded on the video tape to be very convenient.

What is claimed is:

1. A video printer which comprises
    a box for projecting a video, the box having one end adapted to be attached to a lens of a video camera and an end with an opening of the box opposite from the end where the lens is adapted to be attached,
    a light source mounted within the interior of the box,
    a holder for a photograph or a picture having a glass plate, the holder adapted to be secured to an end of the box opposite from the end where a lens is attached, and
    screen means including a first member having a glass surface which is adapted to be secured to the end of the box opposite from the end where a lens is attached, said screen means further including a second member containing a mirror surface pivotly attached to the first member about an axis so as to be detachably exchangeably attached such that the glass surface is disposed inside for displaying a video projected from a movie projector.

2. A video printer according to claim 1, wherein the interior of the box has a stepped portion, and the light source is a fluorescent lamp mounted in the bottom of the stepped portion.

3. A video printer according to claim 1, wherein the glass plate of said holder for the photograph or the picture is formed of transparent glass.

4. A video printer according to claim 1, wherein the glass surface of said screen means is formed of ground glass.

5. A video printer according to claim 1, wherein the screen means further includes at least one arm detachably connecting the first and second members.

6. A video printer according to claim 1, wherein the first member of the screen means includes a frame plate about the glass surface.

7. A video printer according to claim 1, wherein the first and second members are pivotly attached by at least one hinge.

* * * * *